F. TENNEY.
GAME.
APPLICATION FILED DEC. 22, 1919.

1,427,135. Patented Aug. 29, 1922.
5 SHEETS—SHEET 1.

Inventor-
Fred Tenney,
By B. Singer,
Atty.

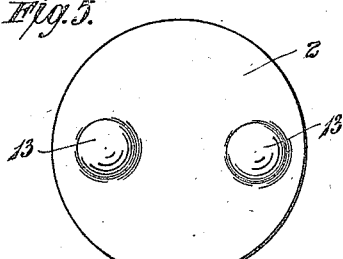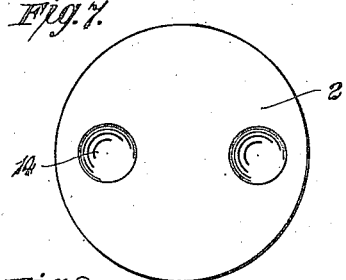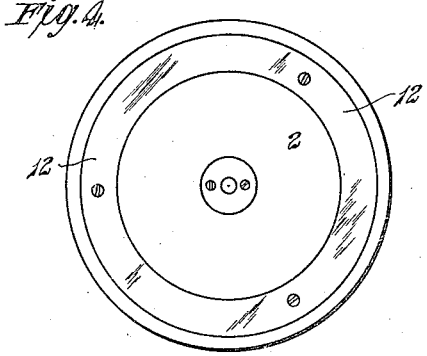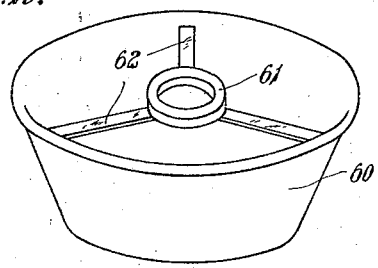

F. TENNEY.
GAME.
APPLICATION FILED DEC. 22, 1919.

1,427,135.

Patented Aug. 29, 1922.
5 SHEETS—SHEET 3.

Inventor.
Fred Tenney,
By B. Singer,
Atty.

F. TENNEY.
GAME.
APPLICATION FILED DEC. 22, 1919.
1,427,135.
Patented Aug. 29, 1922.
5 SHEETS—SHEET 4.
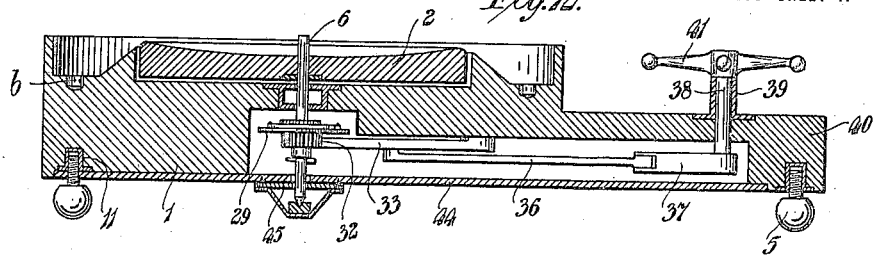
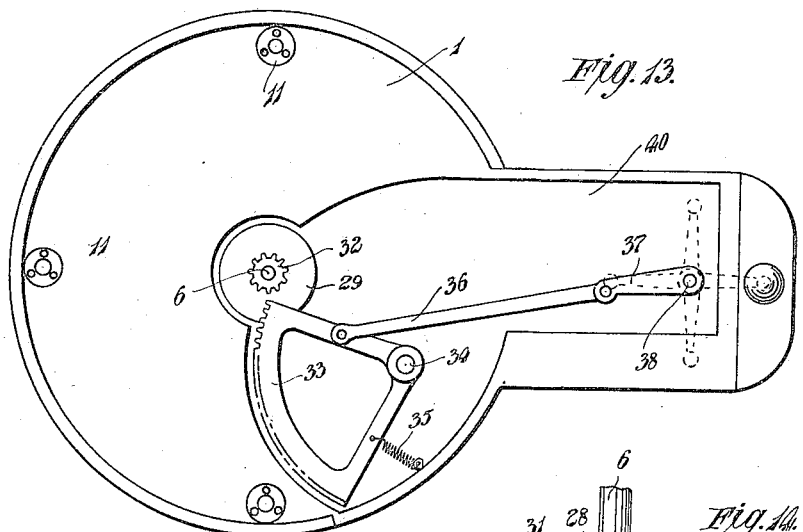
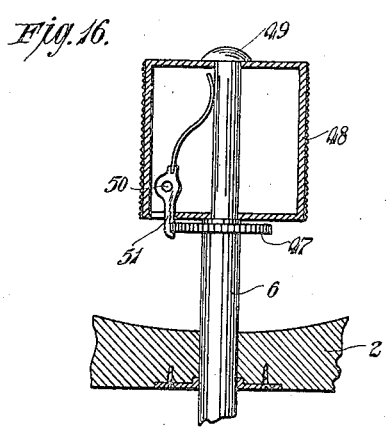
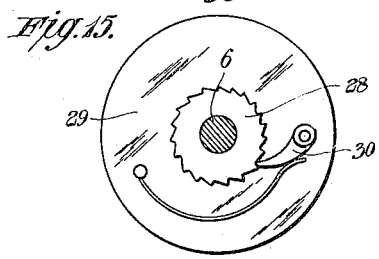
Inventor-
Fred Tenney,
By B. Singer,
Atty.

F. TENNEY.
GAME.
APPLICATION FILED DEC. 22, 1919.

1,427,135.

Patented Aug. 29, 1922.
5 SHEETS—SHEET 5.

Inventor.
Fred Tenney,
By B. Singer,
Atty.

UNITED STATES PATENT OFFICE.

FRED TENNEY, OF DONCASTER, ENGLAND.

GAME.

1,427,135.   Specification of Letters Patent.   Patented Aug. 29, 1922.

Application filed December 22, 1919. Serial No. 346,628.

*To all whom it may concern:*

Be it known that I, FRED TENNEY, of 26 Buckingham Road, Doncaster, England, have invented new and useful Improvements in Games; and I do hereby declare the following to be a full, clear, and exact description of the same.

The present invention relates to apparatus for use in connection with games, and has for its object to provide an apparatus, by the aid of which, various new games of chance, skill, or judgment, or the combination of all three, may be played for the purposes of amusement and recreation. The apparatus forming the subject matter of the present invention has been particularly devised for use in connection with indoor games, and the manner in which it is used, or operated, will to a large extent determine the degree of chance or skill entering into the game, as will hereinafter appear.

The apparatus essentially comprises a stationary part or board, and a rotatable disc mounted thereon and having a concave upper surface upon which a ball, or similar object, may be placed when desired. The stationary board is provided circumferentially in relation to the disc with a plurality of holes or compartments, to each of which may be allotted a scoring value, which may advantageously be marked on the board adjacent thereto.

The general principle of the use and operation of the apparatus is as follows:—

The disc is rotated by hand, with or without the aid of mechanical means, or by means of an electric or clockwork motor. Such rotation may be intermittent or continuous, so that the disc either rotates with gradually decreasing velocity, or rotates at an approximately constant speed. During rotation of the disc a ball, or similar object, is placed by a player on the disc near the centre thereof, preferably within a particular area marked on the surface of the disc. In consequence of the motion and shape of the disc the ball is caused to describe a spiral path round the disc until centrifugal force overcoming the force of gravitation, which tends to cause the ball to roll towards the centre of the disc, compels the ball to fall off the edge of the disc into one of the holes or compartments in the stationary board. The value appertaining to that particular compartment represents the player's score for the ball so played.

If the disc is only rotated at intervals the speed of the rotation of the disc will gradually decrease, and consequently, the action on balls played consecutively will be different. For this reason there is a very small chance of more than one ball in any game falling off the disc at precisely the same point.

If the disc is rotated continuously at an approximately constant speed the element of chance is somewhat reduced, so that skill and judgment may advantageously be used in placing the ball on the disc in such a manner as to cause it to fall off the disc at the required point.

However, in either case a small variation in the point of contact of a ball with the disc will cause quite a large difference between the points on the edge of the disc where the ball will fall off, so that there is again a very small chance of consecutively played balls falling off the disc at the same point.

The degree of curvature of the surface of the disc will control the period of time for which the ball will remain on the disc, and consequently will to a large extent control the difficulty of play, owing to the fact that the larger the curvature the longer will be the path described by the ball before it reaches the edge of the disc and is discharged into a hole or compartment.

If no skill or judgment is used in placing the ball on the disc the game will become entirely a question of chance, but skill or judgment may be used as a result of careful observation of the behaviour of the ball in relation to the speed of rotation of the disc. Constant practice would probably enable the game to be played with a considerable degree of accuracy by a skilled player.

A large variety of different games may be devised in which the apparatus may be used and certain suitable games will be hereinafter mentioned and described.

The invention also comprises certain features of construction which will hereinafter appear from the following description with reference to the accompanying drawings, which illustrate by way of example certain examples of apparatus constructed according to the invention.

In the accompanying drawings:—

Figure 4 is a plan view of the lower surface of the disc shown in Figures 1, 2 and 3.

Figures 5 and 6 are a plan view and a vertical cross sectional view respectively of a modified form of disc.

Figures 7 and 8 are similar views of another modified form of disc.

Figure 12 is a vertical cross sectional view of an example of apparatus wherein the disc is adapted to be spun intermittently by hand with the aid of mechanical means.

Figure 13 is an inverted plan view of the apparatus shown in Figure 12 with the lower cover removed to show the mechanism.

Figures 14 and 15 are respectively a plan view and an elevation to an enlarged scale, of a detail of the mechanism of the apparatus shown in Figures 12 and 13.

Figure 16 is a detail view, to an enlarged scale, illustrating a modification of the apparatus shown in Figures 1 to 4 inclusive.

Figure 19 is a perspective view to an enlarged scale of an attachment which may be used with the apparatus for games of chance only.

Figure 1:
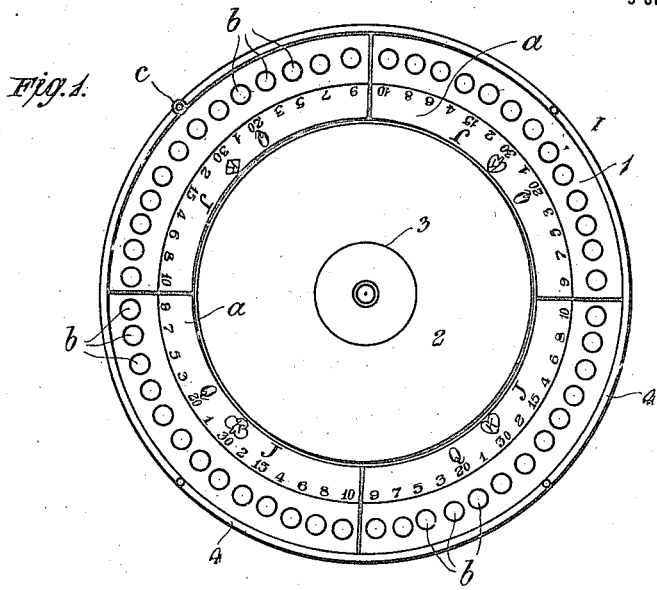
Figures 1, 2 and 3 are respectively a plan view, a side elevation, and a vertical cross sectional view, of an example of apparatus wherein the disc is adapted to be spun directly by hand.

All the examples of apparatus shown in the drawings comprise essentially a stationary part or board 1, and rotatably mounted thereon a disc 2 upon which a ball, or the like, is adapted to be placed for play. The surface of the disc is preferably covered with a cloth covering, as green baize, or the like, and has a ring 3 marked thereon within which the ball must be placed for play. The upper surface of this disc is concave so that when at rest a ball placed thereon naturally rolls towards the centre of the disc under the action of gravity. The stationary board 1 extends beyond the edge of the disc and is provided with an annular upturned flange 4 surrounding the disc and concentric therewith. This flange serves to retain the ball upon the board 1 when it is thrown from the disc. Between the flange 4 and the edge of the disc 2 the board is provided with a sloping annular surface $a$ which extends nearly to the upper surface of the disc 2. The annular channel between the sloping surface $a$ and the flange 4 is formed with a plurality of compartments, or holes, $b$, arranged concentric with the disc 2 and adapted to receive and retain a ball therein when thrown off from the surface of the disc 2. Suitable scoring numbers appertaining to the holes may be marked on the surface $a$ opposite to the respective holes $b$.

The edge of the disc 2 is preferably slightly rounded, or bevelled, so that the tendency of the ball to fly upwards, and over the flange 4, after leaving the disc is counteracted.

In order to ensure that the limit of chance shall be a maximum it is necessary for the board 1, and the surface of the disc 2, to be perfectly level, and for this purpose the board 1 is provided with three adjustable feet 5 which may be screwed in or out of the board 1 until a true level is obtained.

Referring to Figures 1 to 4 of the drawings, the disc 2 is secured to a spindle 6 which passes through a hole in the board 1 and is rotatable therein. The upper end of the spindle is provided with a milled head by which the disc may be rotated with the thumb and fingers. In order to eliminate friction as far as possible the spindle is journalled in a ball bearing 7 which is mounted in the hole in the board 1, and at its lower end is formed, or provided, with a point 8 which rests and rotates in a correspondingly shaped bearing block 9 secured by means of a bracket 10 to the underside of the board 1. The adjustable feet 5 upon which the board 1 is supported each comprises a spherical member having a screwed shank which is adapted to screw into a socket 11 let into the underside of the board 1.

The disc 2 may be made of any suitable material, but it is preferable for it to have sufficient weight to produce momentum enough to enable it to run for a considerable time when once rotated. For this purpose it may be made of metal, but if made of wood it is preferably provided on its underside with an annular ring of metal 12 near to its periphery so that its peripheral weight, and consequently its momentum, may be increased.

If it is desired to introduce a greater degree of chance into the game the surface of the disc may be modified in the manner illustrated by Figures 5 and 6, the surface of the disc being provided with one or more conical projections 13 which serve as obstacles for the ball in its passage over the surface of the disc. Alternatively the surface of the disc may be modified as shown in Figures 7 and 8, according whereto one or more circular depressions 14 are formed in the surface of the disc, which similarly act as obstacles and render the path of the ball erratic.

Alternative to modifying the surface of the disc the element of chance may be increased by using balls which are not truly spherical, and/or are biased on one side by means of a weight, in a manner similar to that well known in connection with the balls used in the game of "bowls".

Figure 9:
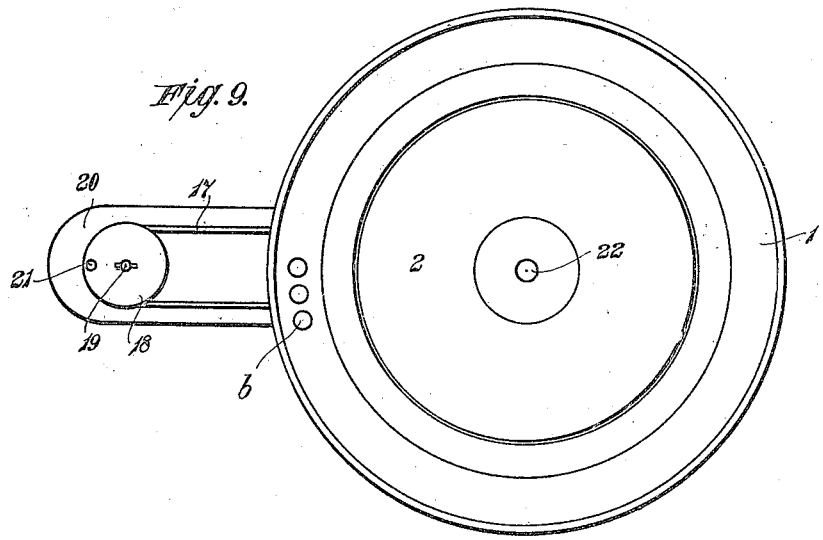
Figures 9 and 10 are a plan view and a vertical cross sectional view of an example of apparatus wherein the disc is adapted to be rotated by hand continuously with the aid of mechanical means.
Figure 10:
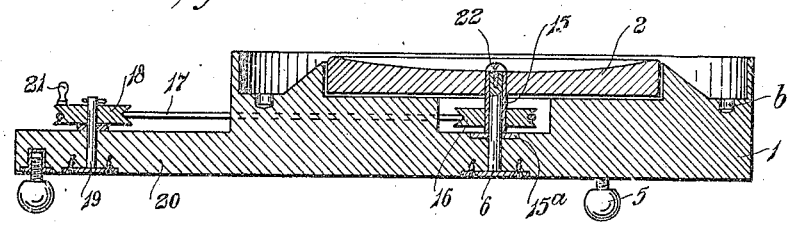

Referring to Figures 9 and 10 of the drawings, the spindle 6 is secured to the stationary board 1, and the disc 2 is secured to a sleeve 15 which is rotatable on the said spindle 6 and supported by a metal bearing washer 15ª. To the sleeve is attached or secured a pulley wheel 16 which is connected by a driving band 17 to another pulley wheel 18 mounted on a spindle 19 projecting from an extension 20 of the board 1. This pulley wheel 18 is rotatable on its spindle 19 and is adapted to be rotated by hand by means of a handle 21. Suitable channels are formed through the board 1 for the passage of the driving band 17. In order to prevent the disc 2 from rising from off the spindle 6 a set screw 22 may be provided which is screwed into the spindle 6 and, projecting over the edge thereof, forms an abutment for the upper edge of the sleeve 15.

Figure 11:
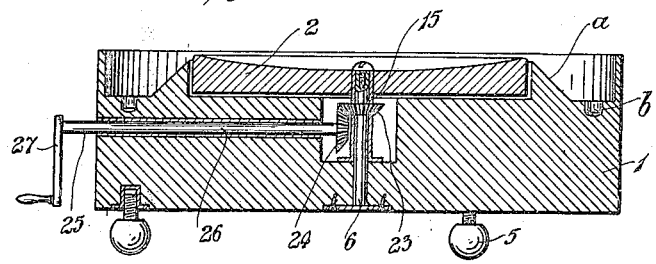
Figure 11 is a vertical cross sectional view of a modification of the example of apparatus shown in Figures 9 and 10.

The example shown in Figure 11 of the drawings is provided with modified means for driving the disc. In this case the sleeve 15 to which the disc 2 is secured is provided with a bevel gear 23 adapted to mesh with another bevel gear 24 mounted on a driving shaft 25 which is journalled in a tube 26 secured in a suitable hole formed in the board 1. The outer end of the shaft 25 is provided with a crank handle 27 by which it may be rotated.

The examples shown in Figures 9, 10 and 11 are particularly adapted for use when it is desired to rotate the disc 2 continuously by hand during play. By this means the velocity of rotation of the disc may be maintained approximately constant, and consequently it is easier to use skill and judgment in playing the balls.

Referring to Figures 12, 13, 14 and 15 of the drawings, the disc 2 is adapted to be rotated by hand intermittently as and when desired with the aid of mechanical means. The mechanical means are adapted to give the disc a higher speed of rotation than would be obtained by means of the thumb and fingers applied to the end of the disc spindle, as in the example illustrated by Figures 1, 2 and 3, and is particularly devised for use in connection with the larger sizes of apparatus wherein the disc 2 may be of considerable size and weight.

Figure 2:
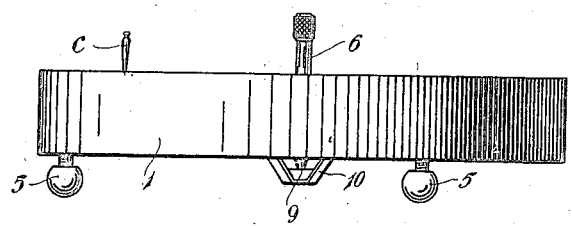
Figure 3:
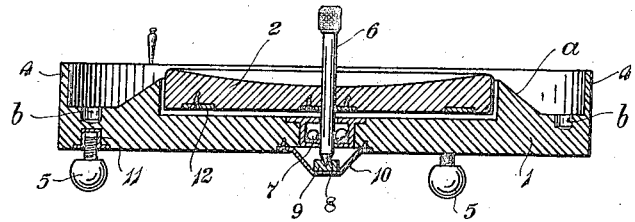

The method of mounting the disc and its spindle is exactly similar to that described with reference to Figures 1, 2 and 3, and need not be further described. Instead however of providing the spindle 6 at its upper end with a milled head by which it may be rotated by hand, it is provided immediately below the ball bearing with a ratchet wheel 28 suitably secured thereto. Immediately below the ratchet wheel is mounted on the spindle a disc 29 which has pivoted thereon a pawl 30 normally pressed into engagement with the teeth of the ratchet wheel by one end of a spring 31 which is secured to the disc 29 at its other end. Below the disc is also mounted on the spindle a toothed gear wheel 32. The disc 29 and the gear wheel 32 are integral with each other, or suitably attached together, and are both freely rotatable on the spindle 6, apart from the limitations imposed by the pawl and ratchet gear 28, 30. It will be clear that rotation of the gear wheel 32 in one direction will cause rotation of the spindle 6 through the intermediary of the pawl and ratchet gear, whilst rotation in the opposite direction will not affect the spindle owing to the pawl 30 slipping over the teeth of the ratchet wheel 28. Similarly when the spindle 6 and the disc 2 secured thereto are rotating the gear wheel 32 may remain stationary without interfering with the motion of the spindle and disc.

The gear wheel 32 is adapted to be rotated by means of a toothed quadrant 33, pivoted at 34 to the under side of the stationary board 1. The quadrant 33 is normally held out of mesh with the gear wheel 32 by means of a tension spring 35 secured to the stationary board 1, and is adapted to be rotated through an angle of about 90° by means of a connecting rod 36, and a crank 37. The crank 37 is secured to the lower end of a spindle 38 mounted in a suitable bearing tube 39 secured to an extension 40 of the board 1. On the upper end of the spindle 38 is mounted a suitable hand wheel device 41, which may be rotated by hand as and when desired.

In order to hold the gear wheel 32 and the pawl disc 29 in position, a pin, or the like, 42 may be passed through the spindle 6, a washer 43 being interposed between such pin and the lower side of the gear wheel 32. A suitable cover 44 is provided for the lower part of the board 1 to enclose the driving mechanism, and in order to relieve the point bearing of the spindle 6 from the lateral thrust exerted by the action of the quadrant 33, there is fixed to the cover 44, a plate 45 having formed therein a hole very slightly larger than the diameter of the spindle 6.

In using this apparatus the hand wheel device 41 is given by hand a succession of oscillatory rotary movements, whereby the quadrant 33 is reciprocated in contact with the gear wheel 32. Owing to the ratchet gear the rearward movements of the quadrant impart motion to the disc 2, whilst the forward movements under the action of the spring 35 are inoperative. By this means the speed of rotation of the disc may be worked up to any suitable and desired high speed, and the disc may then be allowed to run perfectly freely with gradually diminishing speed until it either comes to rest, or until it is desired to again increase its speed.

In Figure 16 is illustrated a modification which may be applied to the apparatus shown for example in Figures 1 to 4 inclusive, for the purpose of working up a higher speed of rotation of the disc than can be obtained by the plain milled head provided on the spindle 6. With the plain milled head practically only one spinning impulse can conveniently be given with the thumb and fingers, whereas by means of the device illustrated in Figure 16, a succession of spinning impulses may conveniently be imparted to the disc, in a manner analogous to that described in reference to Figures 12 and 13.

According to this modification the upper end of the spindle 6 is provided with a ratchet wheel 47 secured thereto, and with a hollow cylindrical member 48 (shown in the drawing to an enlarged scale) rotatably mounted thereon, and held from upward displacement by a head 49 provided on the end of the spindle 6. The periphery of the member 48 is preferably roughened or milled to provide a good grip for the fingers and thumb, and mounted in the interior thereof on a pivot 50 is provided a catch or pawl 51. The lower end of the pawl 51 is adapted to extend through a slot in the bottom of the member 48 and to engage with the teeth of the ratchet wheel 47 under the action of a spring 52 which is secured at one end on the tail part of the pawl 51 and bears with its other curved end against the spindle 6.

It will be readily understood that when the member 48 is rotated by the fingers and thumb in one direction the pawl 51 engaging with the teeth of the ratchet wheel 47 rotates the spindle 6 and thereby the disc 2, whilst if the member 48 is held stationary, or rotated in the reverse direction, the pawl 51 rides over the teeth of the ratchet wheel, and does not in any way affect the rotation of the spindle 6 and the disc 2. By this means a succession of impulses may be given to the disc 2 by repeated oscillatory rotary movements given to the member 48, until the desired speed of rotation is obtained.

As a modification of the above construction instead of arranging the pawl 51 and spring 52 within the cylindrical member 48, they may be disposed upon the lower circular end of the member 48 in a manner similar to that illustrated by Figures 14 and 15.

Figure 17:
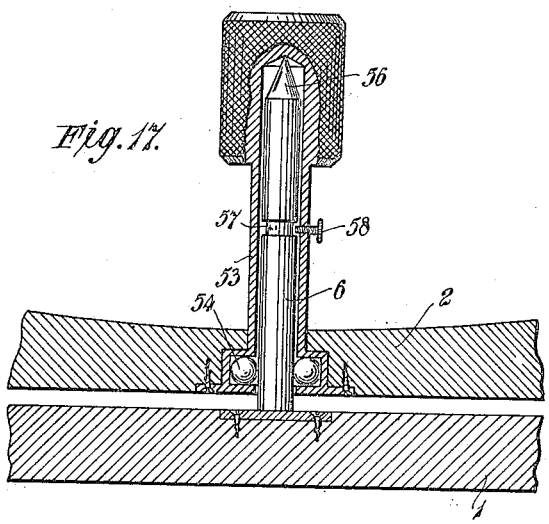
Figure 17 is a sectional view illustrating a further modification of the apparatus shown in Figures 1 to 4 inclusive.
Figure 18:
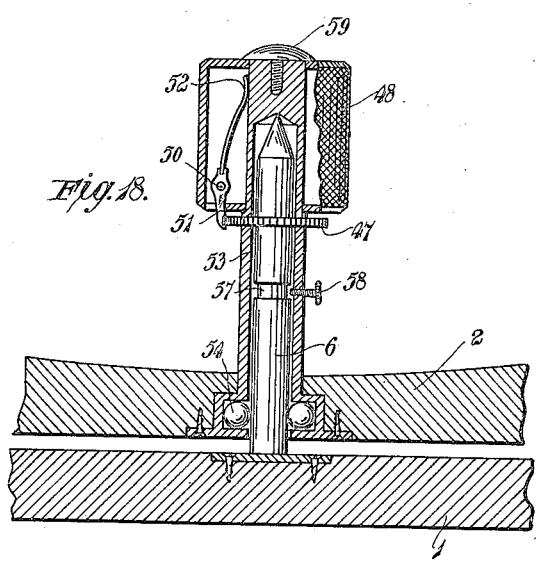
Figure 18 is a sectional view illustrating a combination of the two modifications illustrated by Figures 16 and 17.

Two further modifications which may be applied to the apparatus shown in Figures 1 to 4 inclusive are illustrated respectively by Figures 17 and 18.

In the construction according to these modifications the spindle or pivot 6 for the disc 2 is secured to the upper surface of the stationary board 1, instead of being secured to the disc 2. The disc 2 is secured to a metal sleeve 53 which is formed at its lower end, within the thickness of the disc 2, with a ball bearing cage 54. The internal diameter of the sleeve 53 is such as to enable it to rotate freely on the spindle 6, and its upper end is formed solid and provided with a conical recess for engagement with a bearing point 56 formed on the upper end of the spindle or pivot 6. In order to prevent the sleeve 53 from upward displacement on the spindle 6, a set screw 58 is provided which passes through the sleeve and is adapted to engage with its end in an annular groove 57 formed in the spindle 6. The engagement with the groove 57 is such as to prevent longitudinal displacement of the sleeve without interfering with its rotary movement on the spindle 6.

In the construction illustrated by Figure 17 the upper end of the sleeve 53 is provided or formed with a milled head 55 by means of which the disc 2 is adapted to be spun when desired by the thumb and fingers in a manner similar to that described with reference to Figures 1, 2 and 3.

In the construction illustrated by Figure 18, which is a combination of that described with reference to Figures 16 and 17, the sleeve 53 has secured thereto a ratchet wheel 47, and has loosely mounted thereon a pawl carrying cylinder 48 similar to that described with reference to Figure 16. The upper end of the sleeve is reduced in diameter in order to form a shoulder for the support of the lower end of the cylinder 48, and a set screw 59 is provided in the upper end of the sleeve 53, for the purpose of retaining the cylinder 48 in position on the sleeve 53. For this purpose the head of the set screw is sufficiently large to project beyond the edge of the sleeve 53 and thereby form a shoulder which is adapted to act as an abutment for the upper end of the cylinder 48. The action and method of operation of this construction of device is similar to that described with reference to Figure 16.

In Figure 19 is illustrated an attachment which may be employed in connection with the apparatus hereinbefore described when it is desired to play games where chance only enters into the game. This attachment consists of a conical cup 60 adapted to be placed over the central projection on the disc which may be the spindle 6 (Figure 2), or the sleeve 53 (Figures 17 and 18). The cup is open at both ends but is provided at its upper end with a ring 61 connected to the rim of the cup by spider arms 62. The ring 61 is adapted to fit loosely round the spindle 6 or sleeve 53, and serves to maintain the cup centrally on the disc. In using this attachment the cup 10 is placed on the disc with the ring 61 surrounding the spindle 6 or sleeve 53 and each player places in the cup one or more balls of a distinctive colour. The disc is then set spinning and when a sufficient speed has been attained the cup is raised by hand from the surface of the disc and the balls falling through the lower end thereof are projected from the surface of the disc 2 entirely by chance into the holes or compartments $b$ in the stationary board 1.

The balls used in connection with apparatus according to this invention may be of any suitable material, as glass, wood, ivory, and they may be coloured distinctively so that all the balls of a particular colour may be allotted to a particular player. Their size may vary according to the size of the apparatus with which they are to be used, but for any particular apparatus they will obviously be of a size suitable for engagement in the holes or compartments in the stationary board. As hereinbefore indicated, if skill and judgment is to be part of the game they must be truly spherical, whilst if the game is to be purely one of chance, the balls may be weighted on one side, and/or may be slightly flattened on one side. If desired they may be provided with a plurality of flat sides so as to render their action still more erratic.

In connection with a game which may be played with this apparatus, the stationary board may be marked in the manner indicated on Figure 1 of the drawings. In this case the circumference of the board is divided into four equal parts, each having thirteen compartments to correspond with the thirteen cards of the four suits of a pack of ordinary playing cards. The compartments are allotted values corresponding to the usual playing cards of a suit, and may be arranged in any desired order. A "trump" suit may be selected in any desired manner, and any score made in that suit may be allotted double or other increased value. For convenience the suit which for the time being is the "trump" suit may be indicated on the board by means of a small marker $c$ which may be placed in a small hole provided in the centre of each sector on the periphery of the board. Any convenient number of players may play the game, and a suitable number of balls may be allotted to each. The disc is then rotated until a fair speed is obtained, and each player then plays his balls by placing them one at a time on the disc, the score being obtained by the addition of the values allotted to the compartments into which the balls become lodged. Each player may play his balls consecutively, or they may be played alternately by the several players, according to the rules which may be established for the particular game to be played.

If this apparatus, with the board marked as shown in Figure 1—corresponding to a pack of ordinary playing cards—is used in conjunction with all, or a portion of, the cards of a pack of playing cards, a great number of additional games of a very interesting nature can be devised, thus opening out a new field for the use of playing cards.

Also, the board, instead of, or in addition to being marked as shown in Figure 1, may be marked off in sectors of different sizes and colours, and each sector given a value relative to its size—the less the size of the sector the greater its value, and vice versa.

Thus would the possibilities of this apparatus be still further increased for the playing of a variety of games where the elements of skill or chance or the two elements combined predominate.

Suitable rules may be drawn up for playing any desired game, and various games may be devised by alterations in the method of scoring, the method of spinning the disc, and in the order and method of placing the balls on the disc. The general principle of the apparatus will however remain the same independently of the various games for which it may be used, and many other constructional forms may be devised without departing from the spirit of the invention.

What I claim is:—

1. A game apparatus comprising a stationary board, and a rotatable disc mounted on said board and having a concave upper surface, said board having an annular channel concentric with said disc and pockets in the bottom of said channel spaced away from the edge of said disc and adapted to receive a ball thrown off from the surface of said disc.

2. A game apparatus comprising a stationary board, and a rotatable disc mounted on said board and having a concave upper surface, said board having an annular channel concentric with said disc, pockets in the bottom of said channel spaced away from the edge of said disc and adapted to receive a ball thrown off from the surface of said disc, and a downwardly inclined surface leading from the edge of the upper surface of the disc towards the pockets.

3. A game apparatus comprising a stationary board, a rotatable disk mounted on said board, a plurality of ball receiving compartments in said board arranged circumferentially in relation to said disc, manually operated means adapted to rotate said disc, said means including a pawl and ratchet device whereby the disc is enabled to be given a succession of rotary impulses and to rotate freely without interference from the operating means.

4. A game apparatus comprising a stationary board, a rotatable disc mounted on said board, a plurality of ball receiving compartments in said board arranged circumferentially in relation to said disc, manually operated means including a pinion and an oscillatory rack member adapted to rotate said disc, said means including a pawl and ratchet device whereby the disc is enabled to be given a succession of rotary impulses and to rotate freely without interference from the operating means.

5. A game apparatus comprising a stationary board, a rotatable disc mounted on said board, a plurality of ball receiving compartments in said board arranged circumferentially in relation to said disc, a spindle for said disc, a ratchet wheel secured to said spindle, a pinion loosely mounted on said spindle, a spring pressed pawl connected to said pinion and adapted to engage said ratchet wheel, a segmental rack pivotally mounted on said board and adapted to cooperate with said pinion, spring means adapted normally to hold said rack out of engagement with said pinion, and manually operated means adapted to reciprocate said segmental rack and thereby rotate said pinion and disc.

6. A game apparatus comprising a stationary board, a rotatable disc mounted on said board, a plurality of ball receiving compartments in said board arranged circumferentially in relation to said disc, a spindle for said disc, a ratchet wheel secured to said spindle, a pinion loosely mounted on said spindle, a spring pressed pawl connected to said pinion and adapted to engage said ratchet wheel, a segmental rack pivotally mounted on said board and adapted to cooperate with said pinion, spring means adapted normally to hold said rack out of engagement with said pinion, a connecting rod pivoted at one end to said segmental rack, a crank pivoted to the other end of said connecting rod, a spindle for said crank, and means on said spindle whereby it is adapted for manual rotation.

In testimony whereof I affix my signature in presence of two witnesses.

FRED TENNEY.

Witnesses:
BERTHA LANE,
ETHEL TENNEY.